United States Patent
Burger et al.

(10) Patent No.: US 9,792,252 B2
(45) Date of Patent: Oct. 17, 2017

(54) INCORPORATING A SPATIAL ARRAY INTO ONE OR MORE PROGRAMMABLE PROCESSOR CORES

(71) Applicant: MICROSOFT TECHNOLOGY LICENSING, LLC, Redmond, WA (US)

(72) Inventors: Douglas C. Burger, Bellevue, WA (US); Aaron Smith, Seattle, WA (US); Milovan Duric, Barcelona (ES)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 397 days.

(21) Appl. No.: 14/252,101

(22) Filed: Apr. 14, 2014

(65) Prior Publication Data

US 2015/0100757 A1    Apr. 9, 2015

Related U.S. Application Data

(60) Provisional application No. 61/829,750, filed on May 31, 2013.

(51) Int. Cl.
*G06F 15/00* (2006.01)
*G06F 15/76* (2006.01)
(Continued)

(52) U.S. Cl.
CPC ........ *G06F 15/803* (2013.01); *G06F 9/30076* (2013.01); *G06F 9/3828* (2013.01);
(Continued)

(58) Field of Classification Search
None
See application file for complete search history.

(56) References Cited

U.S. PATENT DOCUMENTS

| | | |
|---|---|---|
| 5,333,280 A | 7/1994 | Ishikawa et al. |
| 5,363,495 A | 11/1994 | Fry et al. |

(Continued)

FOREIGN PATENT DOCUMENTS

| | | |
|---|---|---|
| EP | 0992894 A1 | 4/2000 |
| EP | 1102163 A2 | 5/2001 |

(Continued)

OTHER PUBLICATIONS

Uhrig, et al., Department of Computer Science, University of Augsburg "The Two-dimensional Superscalar GAP Processor Architecture", International Journal on Advances in Systems and Measurements, vol. 3 No. 1 & 2, pp. 71-81, 2010 (11 pages total).

(Continued)

*Primary Examiner* — George Giroux
(74) *Attorney, Agent, or Firm* — Mark K. Young; Mayer & Williams PC (57) ABSTRACT

Functional units disposed in one or more processor cores are communicatively coupled using both a shared bypass network and a switched network. The shared bypass network enables the functional units to be operated conventionally for general processing while the switched network enables specialized processing in which the functional units are configured as a spatial array. In the spatial array configuration, operands produced by one functional unit can only be sent to a subset of functional units to which dependent instructions have been mapped a priori. The functional units may be dynamically reconfigured at runtime to toggle between operating in the general configuration and operating as the spatial array. Information to control the toggling between operating configurations may be provided in instructions received by the functional units.

20 Claims, 9 Drawing Sheets

(51) Int. Cl.
  *G06F 15/80* (2006.01)
  *G06F 15/78* (2006.01)
  *G06F 9/30* (2006.01)
  *G06F 9/38* (2006.01)
(52) U.S. Cl.
  CPC ........ *G06F 9/3891* (2013.01); *G06F 15/7892* (2013.01); *G06F 15/8023* (2013.01)

(56) References Cited

U.S. PATENT DOCUMENTS

| | | | |
|---|---|---|---|
| 5,790,822 | A | 8/1998 | Sheaffer et al. |
| 5,845,103 | A | 12/1998 | Sodani et al. |
| 5,943,501 | A | 8/1999 | Burger et al. |
| 5,983,337 | A | 11/1999 | Mahalingaiah et al. |
| 5,999,737 | A | 12/1999 | Srivastava |
| 6,016,399 | A | 1/2000 | Chang |
| 6,061,776 | A | 5/2000 | Burger et al. |
| 6,112,019 | A | 8/2000 | Chamdani et al. |
| 6,161,170 | A | 12/2000 | Burger et al. |
| 6,164,841 | A | 12/2000 | Mattson et al. |
| 6,185,675 | B1 | 2/2001 | Kranich et al. |
| 6,286,135 | B1 | 9/2001 | Santhanam |
| 6,360,309 | B1 | 3/2002 | Iadonato et al. |
| 6,523,110 | B1 | 2/2003 | Bright et al. |
| 6,779,100 | B1 | 8/2004 | Keltcher et al. |
| 6,918,032 | B1 | 7/2005 | Abdallah et al. |
| 6,934,828 | B2 | 8/2005 | Parthasarathy et al. |
| 6,957,320 | B2 | 10/2005 | Senter et al. |
| 6,988,183 | B1 | 1/2006 | Wong |
| 7,032,217 | B2 | 4/2006 | Wu |
| 7,051,187 | B2 | 5/2006 | Garg et al. |
| 7,152,155 | B2 | 12/2006 | McIlvaine et al. |
| 7,207,038 | B2 | 4/2007 | Bicsak et al. |
| 7,299,458 | B2 | 11/2007 | Hammes |
| 7,308,320 | B2 | 12/2007 | Miyamori |
| 7,310,722 | B2 | 12/2007 | Moy et al. |
| 7,380,038 | B2 | 5/2008 | Gray |
| 7,453,899 | B1 * | 11/2008 | Vaida ............... H04L 45/00 370/419 |
| 7,490,224 | B2 | 2/2009 | Abernathy et al. |
| 7,624,254 | B2 | 11/2009 | Smith et al. |
| 7,676,650 | B2 | 3/2010 | Ukai |
| 7,720,991 | B1 | 5/2010 | Parent et al. |
| 7,779,213 | B2 | 8/2010 | Ferren et al. |
| 7,805,574 | B2 | 9/2010 | Bell, Jr. et al. |
| 7,853,777 | B2 | 12/2010 | Jones et al. |
| 7,877,580 | B2 | 1/2011 | Eickemeyer et al. |
| 7,877,586 | B2 | 1/2011 | Levitan et al. |
| 7,917,733 | B2 | 3/2011 | Kazuma |
| 8,010,953 | B2 | 8/2011 | Gschwind |
| 8,032,734 | B2 | 10/2011 | Svendsen et al. |
| 8,055,881 | B2 | 11/2011 | Burger et al. |
| 8,055,885 | B2 | 11/2011 | Nakashima |
| 8,151,092 | B2 | 4/2012 | Altman et al. |
| 8,180,997 | B2 | 5/2012 | Burger et al. |
| 8,234,635 | B2 | 7/2012 | Isshiki et al. |
| 8,250,555 | B1 | 8/2012 | Lee et al. |
| 8,266,413 | B2 | 9/2012 | Hwu et al. |
| 8,321,850 | B2 | 11/2012 | Bruening et al. |
| 8,433,885 | B2 | 4/2013 | Burger et al. |
| 8,533,436 | B2 | 9/2013 | Fryman et al. |
| 8,555,038 | B2 | 10/2013 | Olson et al. |
| 8,589,662 | B2 | 11/2013 | Altman et al. |
| 8,612,698 | B2 | 12/2013 | Lopez et al. |
| 8,756,605 | B2 | 6/2014 | Aingaran et al. |
| 8,817,793 | B2 | 8/2014 | Mushano |
| 8,930,678 | B2 | 1/2015 | Madduri et al. |
| 9,021,241 | B2 | 4/2015 | Burger et al. |
| 2003/0004683 | A1 | 1/2003 | Nemawarkar |
| 2003/0149862 | A1 | 8/2003 | Kadambi |
| 2006/0259739 | A1 | 11/2006 | Asal et al. |
| 2007/0113171 | A1 | 5/2007 | Behrens et al. |
| 2008/0192050 | A1 | 8/2008 | Schardt et al. |
| 2008/0235493 | A1 | 9/2008 | Fortier |
| 2008/0244506 | A1 | 10/2008 | Killian et al. |
| 2008/0250227 | A1 | 10/2008 | Linderman et al. |
| 2009/0013160 | A1 | 1/2009 | Burger et al. |
| 2010/0070958 | A1 | 3/2010 | Takagi |
| 2010/0082947 | A1 * | 4/2010 | Tramm ............... G06F 9/3885 712/205 |
| 2010/0146209 | A1 | 6/2010 | Burger et al. |
| 2010/0262807 | A1 | 10/2010 | Burky et al. |
| 2010/0325395 | A1 | 12/2010 | Burger et al. |
| 2011/0060889 | A1 | 3/2011 | Burger et al. |
| 2011/0072239 | A1 | 3/2011 | Burger et al. |
| 2011/0078424 | A1 | 3/2011 | Boehm et al. |
| 2011/0252258 | A1 | 10/2011 | Im et al. |
| 2012/0030451 | A1 | 2/2012 | Pong et al. |
| 2012/0303933 | A1 | 11/2012 | Manet et al. |
| 2012/0311306 | A1 | 12/2012 | Mushano |
| 2013/0191817 | A1 | 7/2013 | Vorbach |
| 2013/0198499 | A1 | 8/2013 | Dice et al. |
| 2014/0173222 | A1 | 6/2014 | Alapati et al. |
| 2014/0173262 | A1 | 6/2014 | Chheda et al. |
| 2014/0281416 | A1 | 9/2014 | Abdallah |
| 2014/0281622 | A1 | 9/2014 | Wagh et al. |
| 2014/0282607 | A1 | 9/2014 | O'Sullivan et al. |
| 2014/0317387 | A1 | 10/2014 | Abdallah |
| 2014/0351524 | A1 | 11/2014 | Natarajan et al. |
| 2014/0372736 | A1 | 12/2014 | Greenhalgh |
| 2014/0373022 | A1 | 12/2014 | Chan |
| 2015/0019921 | A1 | 1/2015 | Chen et al. |
| 2015/0067662 | A1 | 3/2015 | Palalau |
| 2015/0100757 | A1 | 4/2015 | Burger et al. |
| 2015/0127928 | A1 | 5/2015 | Burger et al. |

FOREIGN PATENT DOCUMENTS

| | | | |
|---|---|---|---|
| WO | 0125903 | A1 | 4/2001 |
| WO | 2013081556 | A1 | 6/2013 |
| WO | 2014014216 | A1 | 1/2014 |
| WO | 2014193878 | A1 | 12/2014 |
| WO | 2015069583 | A1 | 5/2015 |

OTHER PUBLICATIONS

Benson, et al., "Design, Integration and Implementation of the DySER Hardware Accelerator", in IEEE 18th International Symposium on High Performance Computer Architecture, Feb. 25, 2012, (12 pages total).

Essen, et al., "Energy-Efficient Specialization of Functional Units in a Coarse-Grained Reconfigurable Array", in Proceedings of the 19th ACM/SIGDA International Symposium on Field Programmable Gate Arrays, Feb. 27, 2011, (4 pages total).

Kocabas, et al., "Enhancing an Embedded Processor Core with a Cryptographic Unit for Performance and Security", in Proceedings of the 4th International Conference on Reconfigurable Computing and FPGAs, Dec. 3, 2008, (6 pages total).

Govindaraju, et al., "DySER: Unifying Functionality and Parallelism Specialization for Energy-Efficient Computing", in IEEE Micro, vol. 32, Issue 5, Sep. 2012, (14 pages total).

Putnam, et al., "Dynamic Vectorization in the E2 Dynamic Multicore System", in 1st International Workshop on Highly-efficient Accelerators and Reconfigurable Technologies, Jun. 2010, (6 pages total).

Kim, et al., "Composable Lightweight Processors", in 40th Annual IEEE/ACM International Symposium on Microarchitecture, Dec. 1, 2007, (13 pages total).

"International Preliminary Report on Patentability Issued in PCT Patent Application No. PCT/US2014/039654", dated Aug. 17, 2015, 11 Pages total.

Sankaralingam, et al., "Distributed Microarchitectural Protocols in the TRIPS Prototype Processor", in Proceedings of 39th Annual IEEE/ACM International Symposium on Microarchitecture, Dec. 9, 2006, (12 pages total).

Gupta, et al., "Erasing Core Boundaries for Robust and Configurable Performance", in Proceedings of 43rd Annual IEEE/ACM International Symposium on Microarchitecture, Dec. 4, 2010, (12 pages total).

(56) References Cited

OTHER PUBLICATIONS

Robatmili, Behnam, "Efficient Execution of Sequential Applications on Multicore systems", in Doctoral Dissertation, Aug. 2011, (198 pages total).
"TRIPS (the Tera-op, Reliable, Intelligently adaptive Processing System)", Published on: Oct. 29, 2005 Available at: http://www.cs.utexas.edu/users/cart/trips/ (1 page total).
Smith, et al., "Compiling for EDGE Architectures", in Proceedings of the 4th International Symposium on Code Generation and Optimization, Mar. 26, 2006, (11 pages total).
Smith, Aaron, "Explicit Data Graph Compilation", in PhD Thesis, Dec. 2009, (1 page total).
Gebhart, et al., "An Evaluation of the TRIPS Computer System", in Proceedings of the 14th international conference on Architectural support for programming languages and operating systems, Mar. 7, 2009, (2 pages total).
Burger, et al., "Scaling to the End of Silicon with EDGE Architectures", in Proceedings of Computer, vol. 37, Issue 7, Jul. 2004, pp. 44-55 (12 pages total).
Dittmann, Gero, "On Instruction-Set Generation for Specialized Processors", in Doctoral Dissertation, Retrieved on: Apr. 7, 2015, (122 pages total).
Sankaralingam, et al., "TRIPS: A Polymorphous Architecture for Exploiting ILP, TLP, and DLP", in Proceedings of ACM Transactions on Architecture and Code Optimization, vol. 1, Issue 1, Mar. 2004, pp. 62-93. (32 pages total).
Jones, et al., "A Comparison of Data Prefetching on an Access Decoupled and Superscalar Machine", in Proceedings of Thirtieth Annual IEEE/ACM International Symposium on Microarchitecture, Dec. 1, 1997, (6 pages total).
Pericas, et al., "A Decoupled KILO—Instruction Processor", in Proceedings of the Twelfth International Symposium on High-Performance Computer Architecture, Feb. 11, 2006, (12 pages total).
Melvin, et al., "Enhancing Instruction Scheduling with a Block-Structured ISA", in International Journal of Parallel Programming, vol. 23, No. 3, Jun. 1, 1995, pp. 221-243 (23 pages total).
Reinmany, et al., "Optimizations Enabled by a Decoupled Front-End Architecture", in Proceedings of IEEE Transactions on computers, vol. 50 Issue 4, Apr. 1, 2001, (32 pages total).
Nagarajan ey al., "Static Placement, Dynamic Issue (SPDI) Scheduling for EDGE Architectures", in Proceedings of 13th International Conference on Parallel Architecture and Compilation Techniques, Sep. 29, 2004, (11 pages total).
Smith, Aaron Lee, "Explicit Data Graph Compilation", in Dissertations in Doctor of Philosophy, Dec. 2009, (201 pages total).
Maher, Bertrand Allen, "Atomic Block Formation for Explicit Data Graph Execution Architectures", in Dissertations in Doctor of Philosophy, Aug. 2010, (185 pages total).
Duric, et al., "EVX: Vector Execution on Low Power EDGE Cores", in Proceedings of the Conference on Design, Automation & Test in Europe Conference and Exhibition, Mar. 24, 2014, (4 pages total).
Pengfei, et al., "M5 Based EDGE Architecture Modeling", in Proceedings of IEEE International Conference on Computer Design, Oct. 3, 2010, (8 pages total).
Duric, et al., "Dynamic-vector Execution on a General Purpose EDGE Chip Multiprocessor", in International Conference on Embedded Computer Systems: Architectures, Modeling, and Simulation, Jul. 17, 2014, (8 pages total).
Junier, et al., "Impact of Instruction Cache Replacement Policy on the Tightness of WCET Estimation", in Proceedings of the 2nd Junior Researcher Workshop on Real-Time Computing, in Conjunction to RTNS, Oct. 16, 2008, (4 pages total).
Wilhelm, Reinhard, "Determining Bounds on Execution Times", in Proceedings of Embedded Systems Design and Verification—vol. 1 of the Embedded Systems Handbook, Apr. 7, 2015, (33 pages total).
Peon, et al., "HPACK—Header Compression", Published on: Jul. 31, 2014, Available at: http://tools.ietf.org/html/draft-ietf-httpbis-header-compression-09#page-8 (114 pages total).

Bakhoda, et al., "Microsoft Research—E2", Published on: Mar. 23, 2015 Available at: http://research.microsoft.com/en-us/projects/e2/ (2 pages total).
Gray, Jan, et al., "Towards an Area-Efficient Implementation of a High ILP EDGE Soft Processor: Comparing Out-of-Order Dataflow Instruction Scheduler Designs", (1 page total).
Budiu, et al., "Optimizing Memory Accesses for Spatial Computation", in Proceedings of First International Symposium on Code Generation and Optimization, Mar. 23, 2003, (13 pages total).
Saravana, at al., "TRIPS: A Distributed Explicit Data Graph Execution (EDGE) Microprocessor", in Proceedings of IEEE HotChips Symposium on High-Performance Chips, Aug. 2007, (13 pages total).
Maher, et al., "The Good Block: Hardware/Software Design for Composable, Block-Atomic Processors", in Proceedings of the 15th Workshop on Interaction between Compilers and Computer Architectures, Feb. 12, 2011, (8 pages total).
Nagarajan, Ramadass, "Design and Evaluation of a Technology-Scalable Architecture for Instruction-Level Parallelism", in Doctoral Dissertation, May 2007, (260 pages total).
"Control Flow Graphs and Loop Optimization", Published on: Nov. 7, 2014, Available at: https://engineering.purdue.edu/~milind/ece468/2014fall/lecture-09.pdf (38 pages total).
Smith, Aaron Lee, "Explicit Data Graph Compilation", in Doctoral Dissertation, Dec. 2009, (3 pages total).
"CASH: A C to Layout Compiler", Retrieved Date: Apr. 8, 2015, Available at: http://www.cs.cmu.edu/afs/cs/academic/class/15745-s07/www/papers/cash-journal.pdf (29 pages total).
Budiu, et al., "Pegasus: An Efficient Intermediate Representation", in Technical Report, Apr. 2002, (20 pages total).
Xue, et al., "Partial Dead Code Elimination on Predicated Code Regions", in Journal of Software—Practice & Experience, vol. 36, No. 15, Dec. 2006, (32 pages total).
"Loop-Invariant Code Motion with Unsafe Operations", Retrieved on: Apr. 8, 2015, Available at: http://cs.stackexchange.com/questions/28054/loop-invariant-code-motion-with-unsafe-operations (4 pages total).
Cooper, et al., "Loop Invariant Code Motion—Classical Approaches", Retrieved on: Apr. 8, 2015, Available at: https://www.google.co.in/url?sa=t&rct=j&q=&esrc=s&source=web&cd=2 &ved=0CCMQFjAB&url=http%3A%2F%2Fbooksite.elsevier.com%2F9780120884780%2FGraduate_Lecture_Slides%2FOptimizations%2F23CM-Classic.ppt &ei=9OAkVfDWLYiPuATrp4GIDA &usg=AFQjCNEYXCHF8IV0gQqYXmVfxBPu9Rm4hg &sig2=JSR7hwvDuzeMbKGTHxUzRg (19 pages total).
Nethercote, et al., "Self-Evaluating Compilation Applied to Loop Unrolling", in Technical Report TR-06, Feb. 2006, (17 pages total).
Coons et al., "A Spatial Path Scheduling Algorithm for EDGE Architectures," in Proceedings of the 12th International Conference on Architectural Support for Programming Languages and Operating Systems (ASPLOS), Oct. 12, 2006, (12 pages total).
Desikan et al., "Scalable Selective Re-Execution for EDGE Architectures," in Proceedings of the 11th International Conference on Architectural Support for Programming Languages and Operating Systems, Oct. 9, 2004, (13 pages total).
Govindan et al., "Scaling Power and Performance via Processor Composability," IEEE Transaction on Computers, No. 1, Aug. 2014, (14 pages total).
Gulati et al., "Multitasking Workload Scheduling on Flexible Core Chip Multiprocessors," in Proceedings of the Computer Architecture News, vol. 36, Issue 2, May 2008, (10 pages total).
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)) (21 pages total).
Huang, "Improving Processor Performance Through Compiler-Assisted Block Reuse," in Doctoral Dissertation, May 2000, (125 pages total).

(56) References Cited

OTHER PUBLICATIONS

Keckler et al., "Tera-Op Reliable Intelligently Adaptive Processing System (Trips)," in AFRL-IF-WP-TR-2004-1514, document dated Apr. 2004, (29 Pages total).

Li et al., "Code Layout Optimization for Defensiveness and Politeness in Shared Cache," (also published as Li, et al, "Code Layout Optimization for Defensiveness and Politeness in Shared Cache" 43rd International Conference on Parallel Processing (ICPP), IEEE, pp. 151-161 (2014)). (11 pages total).

Microsoft Research, "E2," document downloaded on Apr. 10, 2015 from http://research.microsoft.com/en-us/projects/e2/ (2 pages total).

Robatmili et al., "How to Implement Effective Prediction and Forwarding for Fusable Dynamic Multicore Architectures," in Proceedings of the 19th IEEE International Symposium on High-Performance Computer Architecture, Feb. 23, 2013, (12 pages total).

Sankaralingam et al., "Exploiting ILP, TLP, and DLP with Polymorphous TRIPS Architecture," in Proceedings of the 30th Annual International Symposium on Computer Architecture, Jun. 9, 2003, (12 pages total).

Sibi et al., "Scaling Power and Performance via Processor Composability," University of Texas at Austin technical report No. TR-10-14 (2010), (20 pages total).

Tamches et al., "Dynamic Kernel Code Optimization," in Workshop on Binary Translation, 2001, (10 pages total).

Smith et al., "Compiling for EDGE Architectures," in Proceedings of International Symposium on Code Generation and Optimization, Mar. 26, 2006, (11 pages total).

Smith, "TRIPS Application Binary Interface (ABI) Manual," Technical Report TR-05-22, Department of Computer Sciences, The University of Texas at Austin, Technical Report TR-05-22, document marked Oct. 10, 2006, (16 pages total).

"Second Written Opinion Issued in PCT Patent Application No. PCT/US2014/039654", dated Mar. 3, 2015, (7 Pages total).

Mei, et al., "ADRES: An Architecture with Tightly Coupled VLIW Processor and Coarse-Grained Reconfigurable Matrix", in Proceedings of 13th International Conference on Field-Programmable Logic and Applications, Sep. 2003, pp. 61-70 (10 pages total).

"International Search Report & Written Opinion for PCT Patent Application No. PCT/US2014/039654", dated Aug. 26, 2014, (13 pages total).

Park, et al., "Polymorphic Pipeline Array: A Flexible Multicore Accelerator with Virtualized Execution for Mobile Multimedia Applications", in Proceedings of the 42nd Annual IEEE/ACM International Symposium on Microarchitecture, Dec. 12, 2009, pp. 370-380. (11 pages total).

Bouwens, et al., "Architecture Enhancements for the ADRES Coarse-Grained Reconfigurable Array", in Proceedings of the 3rd International Conference on High Performance Embedded Architectures and Compilers, Jan. 27, 2008, pp. 66-81. (16 pages total).

Duric, et al., "ReCompac: Reconfigurable Compute Accelerator", in Proceedings of the International Conference on Reconfigurable Computing and FPGAs, Dec. 9, 2013, (4 pages total).

"International Search Report and Written Opinion Issued in PCT Application No. PCT/US2016/038849", dated Sep. 30, 2016, (15 Pages total).

"International Search Report and Written Opinion Issued in PCT Application No. PCT/US2016/038850", dated Sep. 22, 2016, (12 Pages total).

Behnam Robatmili, et al., "Strategies for Mapping Dataflow Blocks to Distributed Hardware", in the proceedings of the 41st IEEE/ACM International Symposium on Microarchitecture, Nov. 8, 2008, (12 Pages total).

"International Search Report and Written Opinion Issued in PCT Application No. PCT/US2016/038851", dated Sep. 27, 2016, 11 Pages.

"International Search Report and Written Opinion Issued in PCT Application No. PCT/US2016/038852", dated Sep. 23, 2016, (14 Pages total).

* cited by examiner

INCORPORATING A SPATIAL ARRAY INTO ONE OR MORE PROGRAMMABLE PROCESSOR CORES

STATEMENT OF RELATED APPLICATION

This application claims the benefit of provisional application No. 61/829,750 filed May 31, 2013, the disclosure of which is incorporated by reference herein.

BACKGROUND

Programmable processor cores may be utilized to execute groups or blocks of instructions as atomic units. Such instructions are mapped to the functional units in the cores and significant efficiencies can often be realized when execution loops are created in which the same process is repeated over and over. New data may be continually received and processed as a stream without the need to fetch new instructions. While efficiency is improved in this way, the typical communications paths that are utilized to carry the instructions, for example over a bypass network, are comparatively inefficient.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Functional units disposed in one or more processor cores are communicatively coupled using both a shared bypass network and a switched network. The shared bypass network enables the functional units to be operated conventionally for general processing while the switched network enables specialized processing in which the functional units are configured as a spatial array. In the spatial array configuration, operands produced by one functional unit can only be sent to a subset of functional units to which dependent instructions have been mapped a priori. The functional units may be dynamically reconfigured at runtime to toggle between operating in the general configuration and operating as the spatial array. Information to control the toggling between operating configurations may be encoded in instructions received by the functional units, provided in control state associated with an instruction block, provided in other control state embedded in program binary, or be inferred dynamically by hardware.

In various illustrative examples, one or more programmable processor cores are configured to receive and process instructions on a block basis. Functional units in a core may be coupled for inter-functional unit communications using a traditional bypass network and may also be coupled with a separately controlled lightweight switched network that provides a set of specialized datapaths to facilitate communications when the functional units are configured as a spatial array. A mesh is a common topology, for example, that is well suited for this switched network. Each node of the switched network typically includes a multiplexer and a configuration memory that are used to implement highly efficient instruction communications over the specialized datapaths. Instruction blocks may include embedded control information (to toggle the operating configuration of the functional units) and further may include static execution schedule information that is used to map the computations to the functional units when configured as a spatial array.

A specialized compiler, or specialized mapping functionality within a standard compiler, is arranged to recognize code that is likely optimally executed on the spatial array at runtime and can automatically embed the control and schedule information into the instruction set produced as compiler output. Alternatively, the specialized compiler may be arranged to make suggestions to a code developer as to which configuration (i.e., general processing or spatial array) is more likely to execute particular computations with the greatest efficiency (or other figure of merit).

As the blocks of instructions are decoded at runtime, the functional units are dynamically reconfigured by being toggled between the general processing and spatial array configurations according to the embedded control instruction. When configured as a spatial array, a static execution schedule is decoded to map the computations to the array and set up the routing paths through the switched network. The spatial array can then efficiently stream through datasets that are read out of data queues which are connected to the switched network.

The present incorporation of a spatial array into one or more programmable processor cores can be used as the basis of a new processor microarchitecture and ISA (Instruction Set Architecture). In some implementations, functional units across multiple programmable processor cores may be commonly configured in order to provide a larger single spatial array than would be allowed by the number of functional units in a single core. Even larger spatial arrays can be created, in some applications, by extending the switched network to cover functional units in more cores using repeaters that are positioned along the network at various points. The static execution schedule is configured to take into account any propagation delays in such a larger spatial array when mapping the specialized datapaths.

Advantageously, the present incorporation of a spatial array into one or more programmable processor cores enables the high efficiency that is afforded by parallel processing in the spatial array without the complexity and cost of implementing a separate spatial array with duplicated functional units. By overlaying the switched network over the conventional bypass network, the functional units of general purpose cores can effectively be repurposed on-the-fly between normal operation and spatial array to efficiently and effectively meet the requirements of a given process/computation. By embedding the control information in an instruction block (for example, by repurposing otherwise unused fields/bit positions), the instruction interface to the spatial array is entirely consistent with the ISA that is used when the functional units are operating normally in the general processing configuration.

Applications of the present incorporation of a spatial array into one or more programmable processor cores illustratively include small form factor computers, cameras, mobile phones, smartphones, wearable computers, or the like, in which image processing and similar types of processing are employed which can make good use of the processing parallelism afforded by the spatial array.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
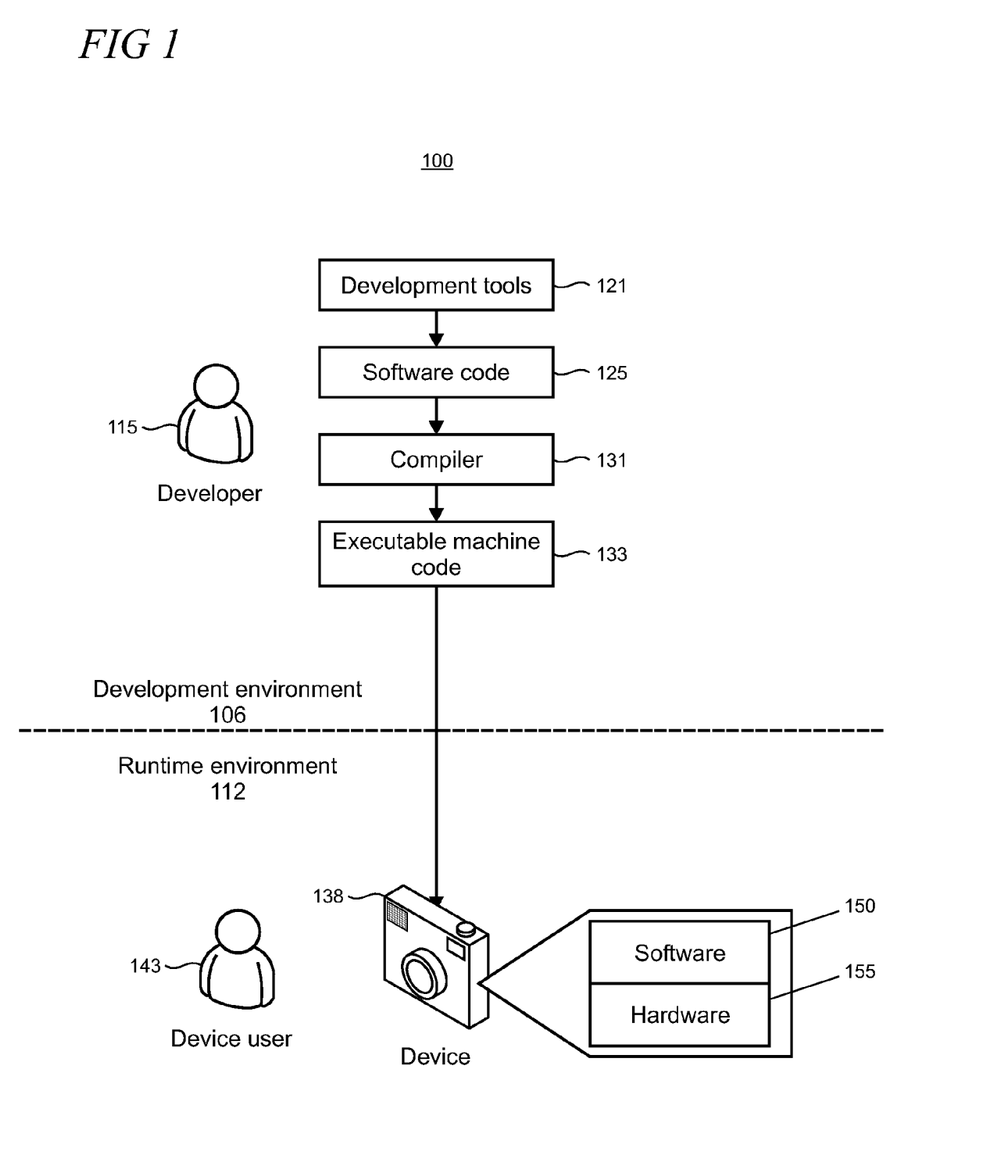
FIG. 1 shows an illustrative usage environment that may implement various aspects of the present incorporation of a spatial array into one or more programmable processor cores.
Figure 2:
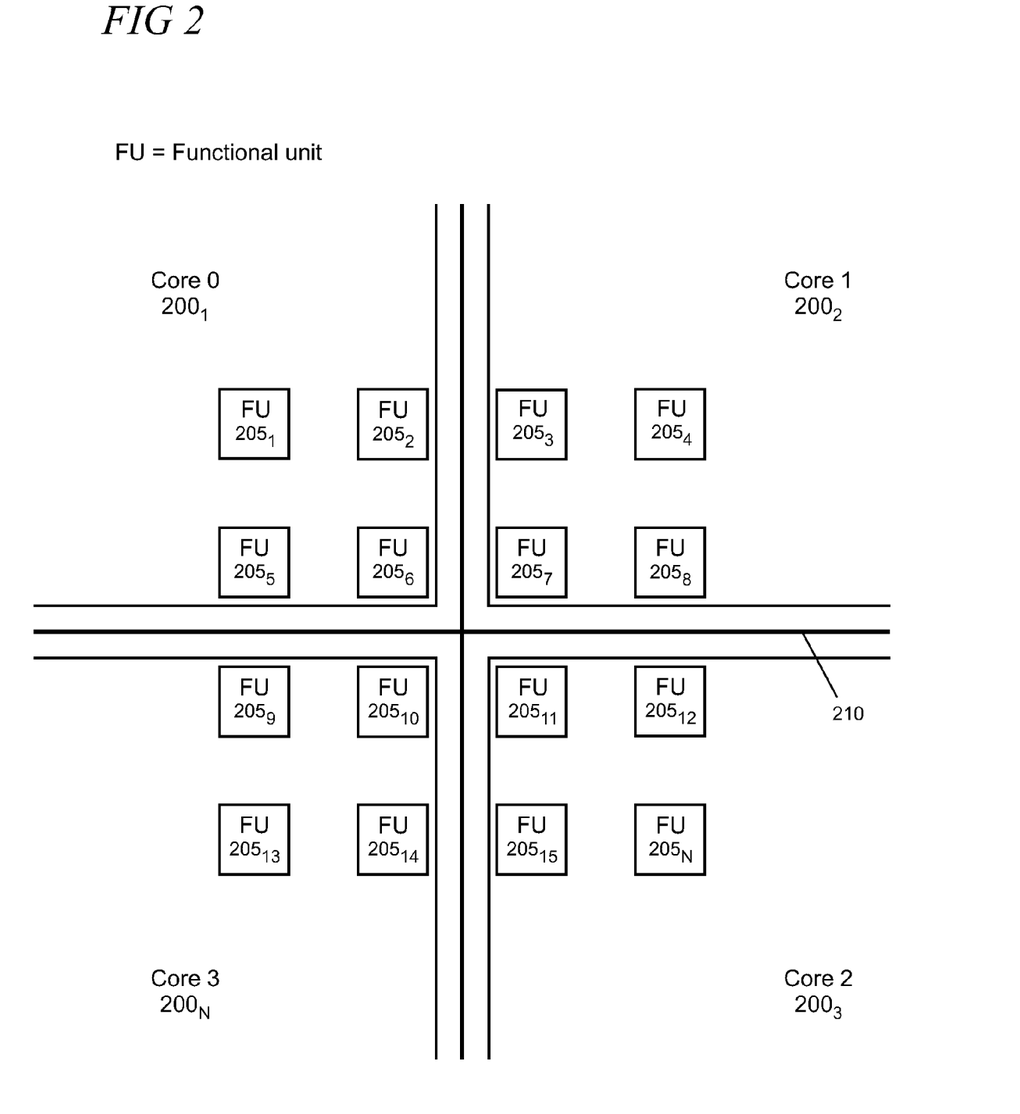
FIG. 2 shows an illustrative group of programmable processor cores that each include a number of functional units that are operable in a conventional manner for general processing.

FIG. 1 shows an illustrative usage environment 100 that may implement various aspects of the present incorporation of a spatial array into one or more programmable processor cores. The environment 100 includes a development environment 106 and a runtime environment 112. In the development environment a developer 115 typically works with tools 121, development frameworks, and the like, to create software code 125 that is compiled via a compiler 131 into executable machine code 133. The executable machine code 133 can then be instantiated on a device 138 that, when executed in the runtime environment 112, provides various functionalities and features for a device user 143. FIG. 2 shows an illustrative group of programmable processor cores $200_1 \ldots _N$ that each include a number of functional units $205_1 \ldots _N$ that are operable in a conventional configuration for general processing. The cores 200 may be part of a processor that is included, for example, as part of the hardware components 155 of device 138 (FIG. 1). The number of cores 200 and the number of functional units 205 employed in the cores are shown in the drawing for illustrative purposes only. Thus, the number of cores 200 and functional units 205 utilized in an actual implementation can vary from that shown according to the particular requirements of such implementation. The functional units 205 may be implemented as arithmetic logic units (ALUs) in some cases and are coupled for inter-functional unit communication typically using a shared operand communication network or pipelined network, such as a conventional bypass network (not shown). Inter-core communication may be facilitated using an inter-core bus 210.

Figure 3:
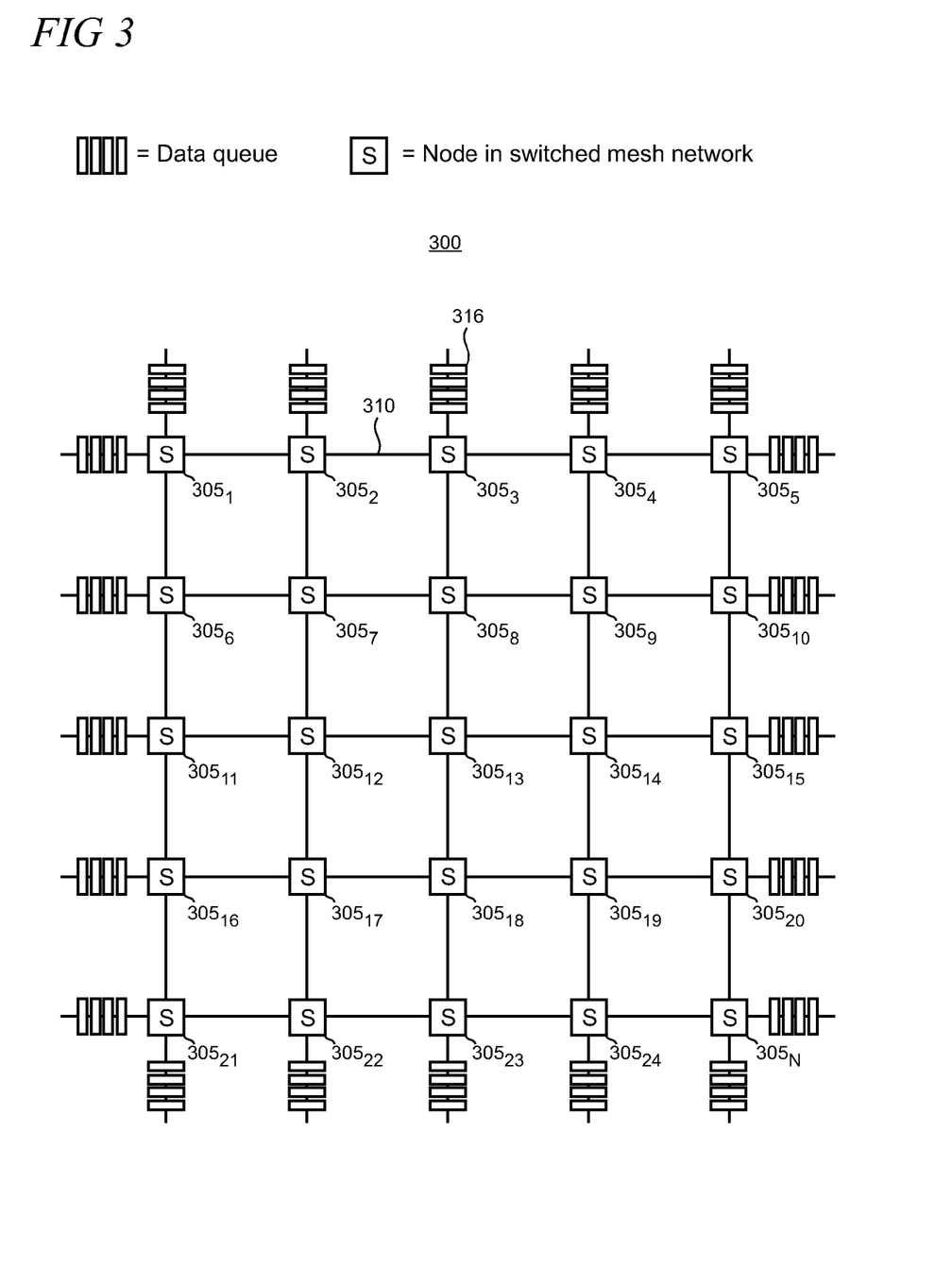
FIG. 3 shows an illustrative switched network that is configured to overlay the functional units to enable their configuration as a spatial array.

FIG. 3 shows an illustrative switched network 300 that is configured to overlay the functional units to enable their configuration as a spatial array. A plurality of switching nodes $305_1 \ldots _N$ are arranged using an interconnected mesh 310. In typical applications the mesh 310 is a two dimensional (2D) mesh, although three dimensional (3D) meshes, 2D tori, or other topologies may also be employed in some scenarios. As shown in FIG. 3, data queues (representatively indicated by reference numeral 316) are located around the periphery of the switched network 300 to buffer data flowing into and out of the network. The number and functionality of switching nodes 305 and data queues 316 used in any given implementation will typically be dependent on specific usage requirements and thus may be expected to vary from what is shown.

Figure 4:
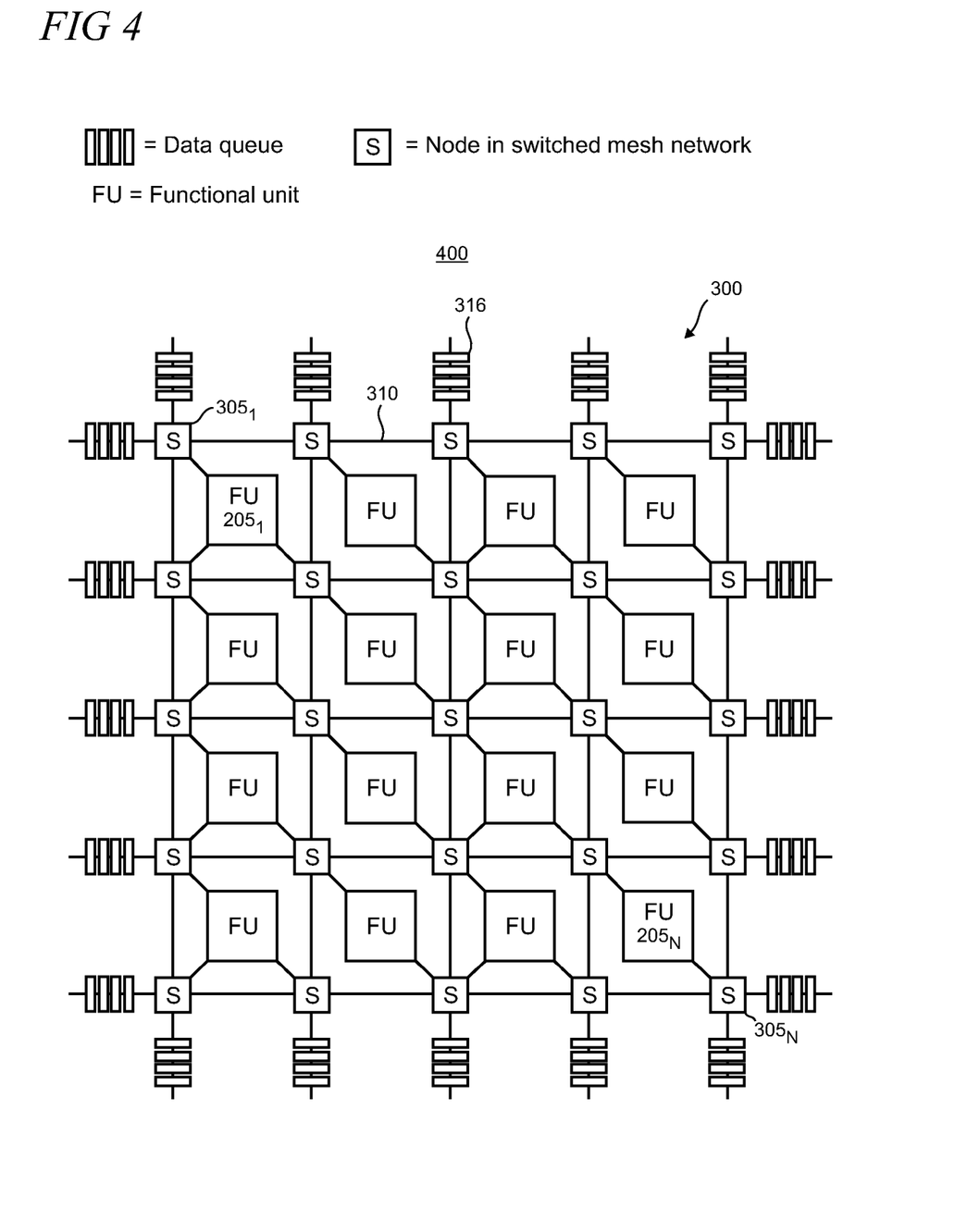
FIG. 4 shows the switched network when overlaid on the functional units.
Figure 5:
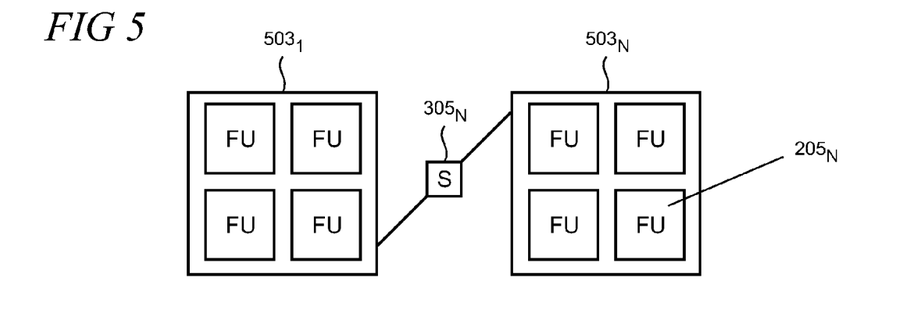
FIG. 5 shows an alternative overlay network topology in which groups of functional units are operatively coupled to a switched node in the switched network.

FIG. 4 shows the switched network 300 when overlaid on the functional units 205 to enable configuration as a spatial array 400. Spatial array 400 may also be referred to as a spatial acceleration array or spatial acceleration fabric. As shown, each functional unit 205 is connected to at least one switching node 305 in the network 300. An alternative network overlay topology is shown in FIG. 5 in which one or more groups $503_1$ and $503_N$ of functional units 205 may be operatively coupled to a switching node 305. In this alternative topology, one functional unit is utilized at a time in the spatial array 400 (FIG. 4). While this topology results in a coarser spatial array which provides relatively less amounts of parallel processing, fewer switching nodes are utilized which can provide benefits in some cases in terms of cost savings and reduction in network complexity and scheduling. In some implementations, the switched network may be arranged for conformance with the execution model known as "Dynamic Specialized Execution Resource" (DySER) as described by Govindaraju, Venkatraman; Ho, Chen-Han; Nowatzki, Tony; Chhugani, Jatin; Satish, Nadathur; Sankaralingam, Karthikeyan; Kim, Changkyu "DySER: Unifying Functionality and Parallelism Specialization for Energy-Efficient Computing" IEEE MICRO, 2012.

Figure 6:
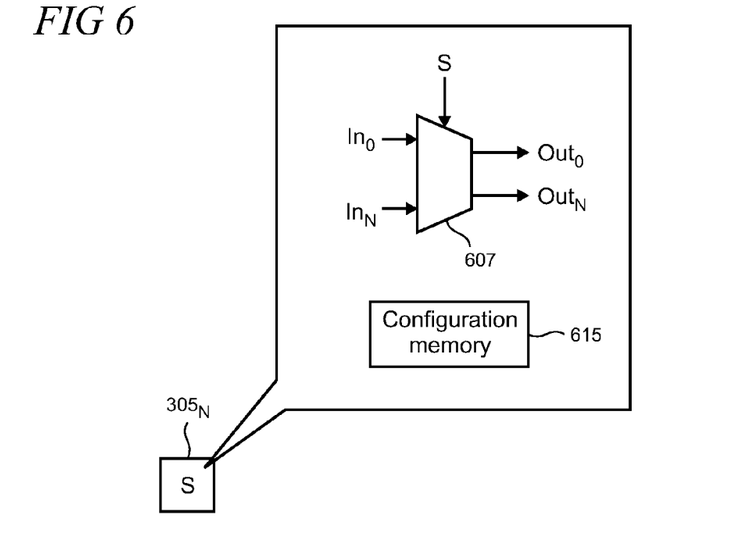
FIG. 6 shows details of an illustrative switched node in the switched network.

FIG. 6 shows details of an illustrative switched node 305 in the switched network 300 (FIG. 3). Each switched node 305 is typically arranged to include a multiplexer 607 and an associated configuration memory 615. The multiplexer 607 operates to select from two or more inputs to provide one or more outputs according to a control signal, S. The configuration memory 615 typically is utilized to store state and other configuration data associated with the switched node 305.

During runtime, when the processor cores 200 (FIG. 2) are typically fetching instructions and running data, the functional units 205 may be dynamically configured (and reconfigured) to operate either conventionally for general processing using the shared bypass network, or as part of the spatial array 400 (FIG. 4) using the switched network 300. In an illustrative example, the configuration information needed to set and/or toggle the configuration of the functional units for either general processing or as a spatial array may be dispatched to the cores 200 as part of instructions in the block. In alternative arrangements, control of the configuration of the functional units may be provided in control state associated with an instruction block, provided in other control state embedded in program binary, or be inferred dynamically by hardware.

Figure 7:
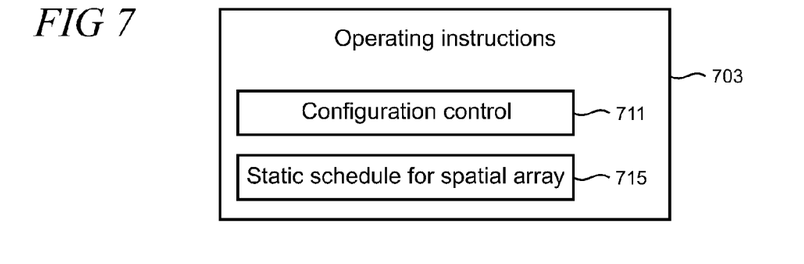
FIG. 7 shows an illustrative instruction block in which a region of the block has encoded configuration control information as well as a static execution schedule embedded therein.

FIG. 7 shows an instruction block 703 in which a region of the block is encoded to include configuration control information 711 as well as a static execution schedule 715 that is used to map the instructions to the spatial array 400. In some implementations, the existing ISA for conventional general processing may be utilized with slight modifications that do not negatively impact ISA compatibility. For example, fields or bit positions known as "targets" in an instruction which normally specify routing path and timing for general processing can be repurposed to encode the control information and static execution schedule data for the spatial array 400. Such repurposing advantageously allows the overlay switched network to be very lightweight without requiring additional ISA decoding complexity. When the instruction block is unpacked, instead of the targets being saved in buffers in the normal places in the instruction window, the control and static execution schedule data is read out so that the desired state is implemented for the particular local instruction.

In alternative implementations, the control and static execution schedule information can be packed into a separate monolithic instruction block that is reserved to specify state without the inclusion of additional operating instructions. In addition, a combination of embedded state and separate state specifications may be utilized in some cases.

Figure 8:
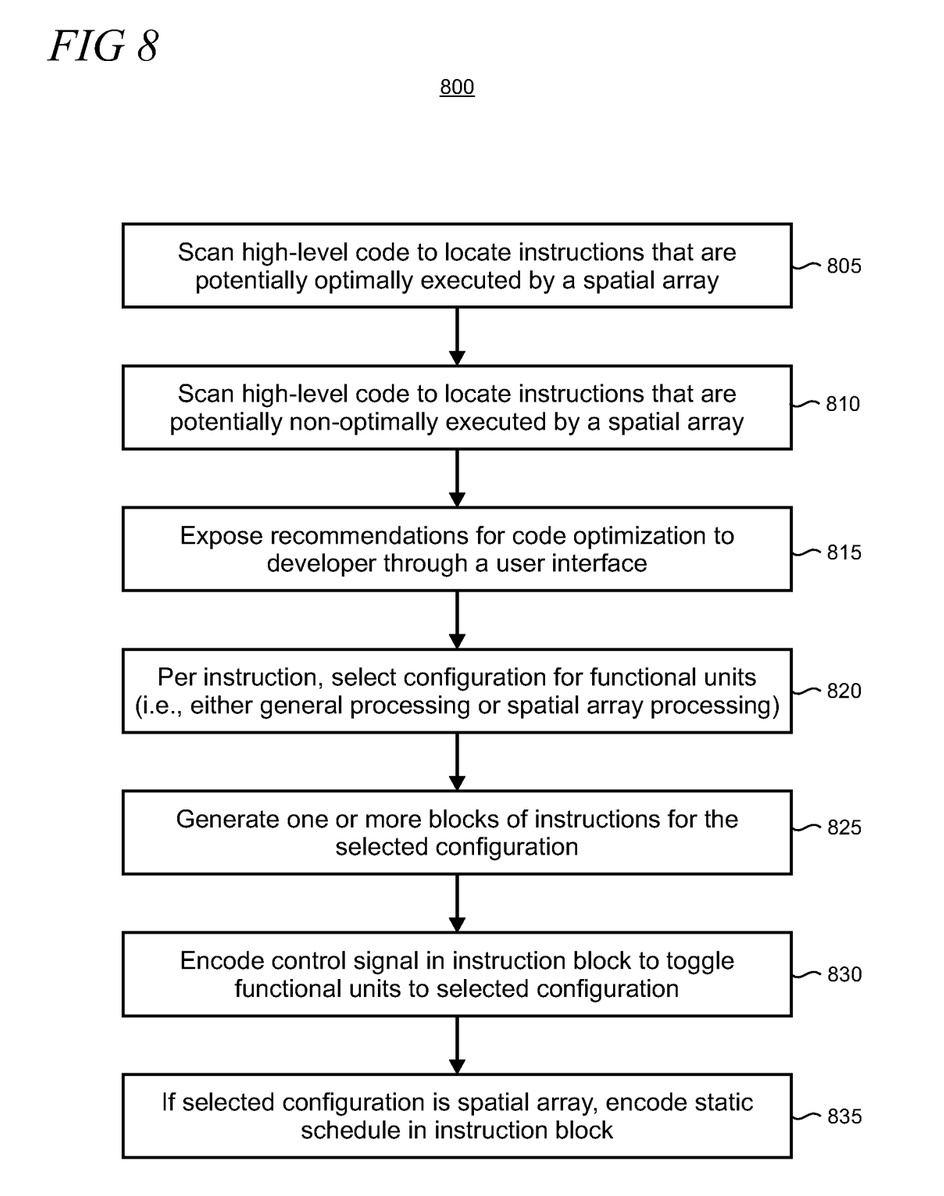
FIG. 8 is a flowchart of an illustrative method that may be employed by a specialized compiler or by a specialized mapping functionality within a standard compiler.

FIG. 8 is a flowchart of an illustrative method 800 that may be employed, for example, by the specialized compiler 131 shown in FIG. 1. Alternatively, the method 800 may be implemented using a specialized mapping functionality that is incorporated within a standard compiler. Unless specifically stated, the methods or steps in the flowchart of FIG. 8 and those in the other flowcharts shown in the drawings and described below are not constrained to a particular order or sequence. In addition, some of the methods or steps thereof can occur or be performed concurrently and not all the methods or steps have to be performed in a given implementation depending on the requirements of such implementation and some methods or steps may be optionally utilized. Likewise, some steps may be eliminated in some applications to reduce overhead but which may result in increased brittleness, for example. The various feature, cost, overhead, performance, and robustness tradeoffs which may be implemented in any given application may typically be viewed as a matter of design choice.

The method 800 starts by scanning high-level code during the compilation process to identify potential instructions that are potentially optimally executed by the spatial array at runtime (as indicated by reference numeral 805). Similarly, the high-level code is scanned to identify instructions that are not optimally executed by the spatial array at runtime, and instead may be executed by the functional units when configured for general processing (810). In some implementations the recognition of instructions that are particularly well suited for one configuration or the other can be performed entirely automatically or substantially automatically by the specialized compiler 131. In other cases, the compiler 131 can be adapted to expose recommendations and/or a best prediction as to code performance under the various functional unit configurations to the developer 115 (FIG. 1) through a user interface (815).

The specialized compiler 131 selects a functional unit configuration on a per-instruction or group of instructions basis (820) and generates one or more block of instructions for the selected configuration (825). The compiler will also embed encoded control signal information into the instruction blocks to set the functional units to the selected configuration at runtime (830). If the selected functional unit configuration is spatial array, then the specialized compiler 131 will also embed an encoded static execution schedule into the instruction blocks (835). As noted above, in alternative implementations, a separate and unique instruction block can be reserved for dispatching configuration and/or state information.

In some cases, the compiler may identify "holes" in the static execution schedule in which a functional unit is not being used for a current instruction at runtime and thus may be available for processing. As used herein, holes are defined as cycles during which the functional units are unoccupied by the static execution schedule. When a dynamically scheduled instruction is issued from the regular mode into a hole, the static execution schedule is not perturbed nor are any structural hazards created. By enabling the processor's wakeup and select logic to issue instructions into those holes the compiler can fill holes in the static execution schedule with regular dynamic instructions so that functional unit utilization may be increased. Implementation of such hole filling techniques further enables the array to be used in a hybrid mode of operation, supporting both modes of execution at once. Additionally, the compiler may insert holes into the static execution schedule to make room for dynamically issued instructions from the standard mode of operation.

Figure 9:
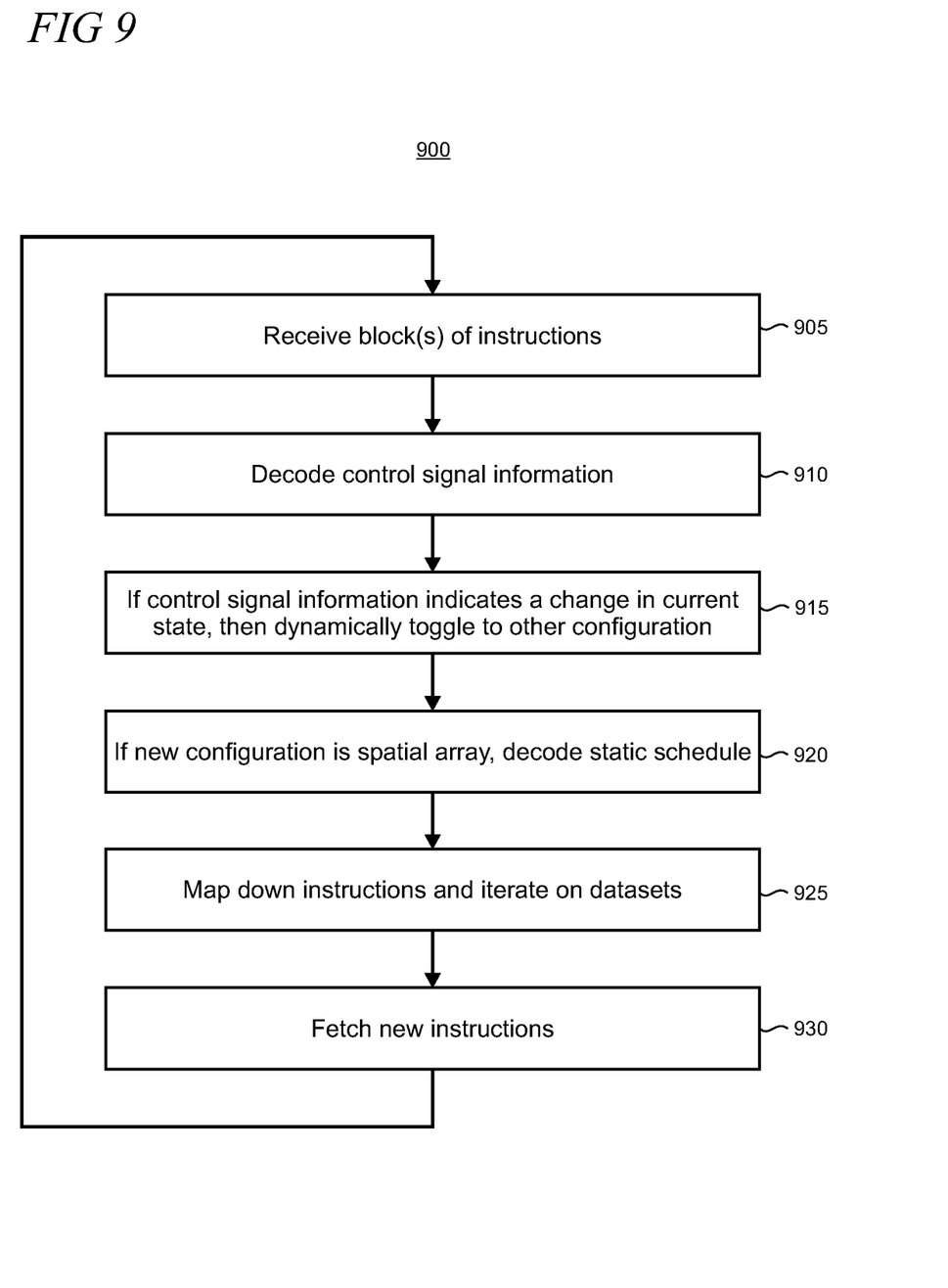
FIG. 9 shows a flowchart of an illustrative method that may be employed by functional units during runtime.

FIG. 9 shows a flowchart of an illustrative method 900 that may be employed by the functional units 205 (FIG. 2) during runtime. One or more blocks of instructions are received at an instruction interface (as indicated by reference numeral 905). The control signal information is decoded (910). If the control signal indicates that the current configuration needs to be changed, then the functional units are dynamically toggled to the other configuration (915). For example, if the functional units are currently configured for general processing and the control signal information indicates that the current instruction should be executed using the spatial array, then the functional units are toggled into the spatial array configuration.

If the new configuration is spatial array, then the static execution schedule is decoded to set up the array (920). The instructions are mapped to the functional units which will typically iterate on datasets (925) until new instructions are fetched (930). The method then repeats from step 905.

Figure 10:
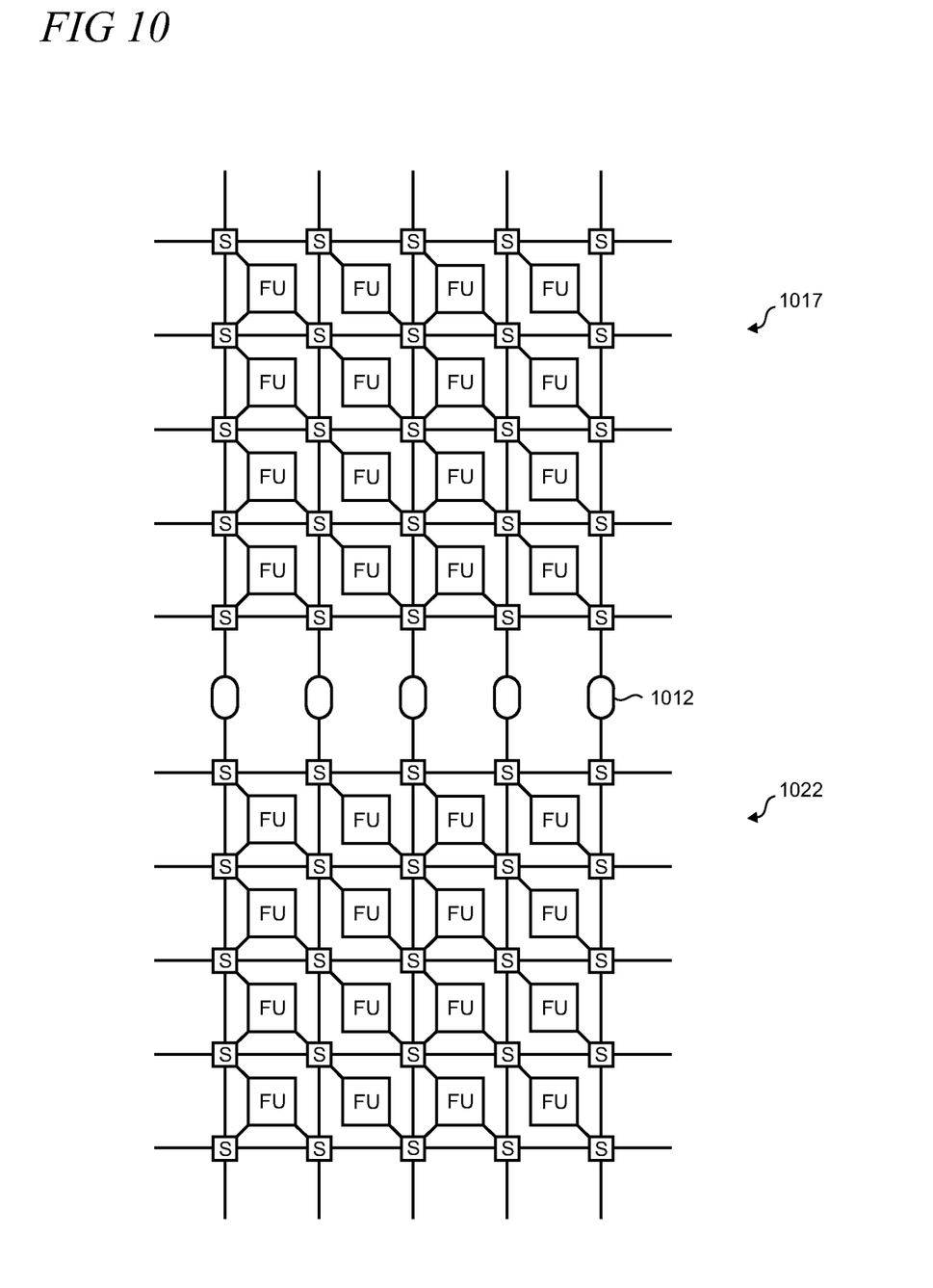
FIG. 10 shows an arrangement in which a spatial array architecture may be extended to include additional functional units using repeaters.

FIG. 10 shows an arrangement in which a spatial array architecture may be extended to include additional functional units using repeaters. In typical implementations, a spatial array can comprise functional units in a single core or in pairs of cores, for example, two or four cores. In scenarios in which a larger spatial array is desired, repeaters can be disposed at certain points in the switched network to adjust for propagation delays that may occur through the extended network. The specialized compiler 131 (FIG. 1) can also take such delays into account when generating the static execution schedule for the spatial array. As shown in FIG. 10, a set of repeaters (representatively indicated by reference numeral 1012) is located between two sub-meshes 1017 and 1022. Each sub-mesh in this example includes functional units spanning four cores. In some implementations, the specialized compiler can generate a single static execution schedule for a larger spatial array. Should only a smaller spatial array be available at runtime, artificial delays can be introduced to enable the larger static execution schedule to be superimposed on the smaller spatial array.

Figure 11:
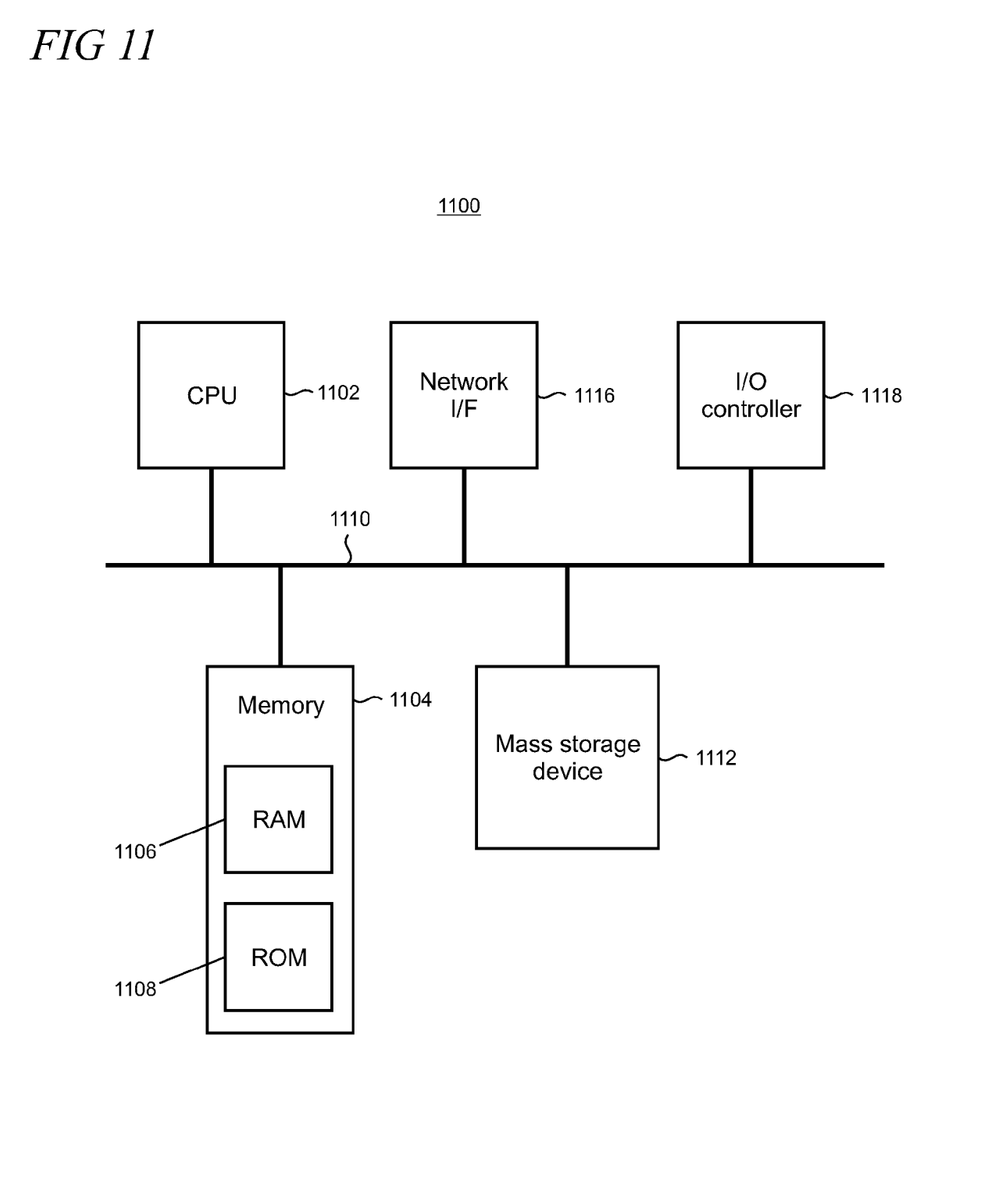
FIG. 11 shows an illustrative configuration in which one or more fixed spatial arrays are arranged external to the cores; and Like reference numerals indicate like elements in the drawings. Elements are not drawn to scale unless otherwise indicated.

FIG. 11 shows an illustrative configuration in which one or more fixed spatial arrays are arranged external to the cores 200 (FIG. 2). In this example, functional units distributed across cores 200 are arranged for selectable configuration between general processing and spatial array processing using bypass and switched networks, as described above. One or more fixed spatial arrays (representatively indicated by reference numeral 1105) are located external to the cores 200 but are in operative communication with the cores using a communications infrastructure (not shown). At runtime, blocks of instructions that are designated by the compiler 131 (FIG. 1) to be given special handling can be dispatched to the fixed spatial array 1105 outside the cores 200. In this way important or otherwise significant computational loops can be executed by the fixed spatial array 1105 with even greater efficiency than could be realized by the general purpose cores 200 when configured as a spatial array.

It should be appreciated that the software components described herein may, when loaded into the CPU 1202 and executed, transform the CPU 1202 and the overall architecture 1200 from a general-purpose computing system into a special-purpose computing system customized to facilitate the functionality presented herein. The CPU 1202 may be constructed from any number of transistors or other discrete circuit elements, which may individually or collectively assume any number of states. More specifically, the CPU 1202 may operate as a finite-state machine, in response to executable instructions contained within the software modules disclosed herein. These computer-executable instructions may transform the CPU 1202 by specifying how the CPU 1202 transitions between states, thereby transforming the transistors or other discrete hardware elements constituting the CPU 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1200 in order to store and execute the software components presented herein. It also should be appreciated that the architecture 1200 may include other types of computing devices, including hand-held computers, small form factor computers, wearable computers and devices, embedded computer systems, smartphones, PDAs, and other types of computing devices known to those skilled in the art. IBased on the foregoing, it should be appreciated that technologies for incorporating a spatial array into one or more programmable processor cores have been disclosed herein. Although the subject matter presented herein has been described in language specific to computer structural features, methodological and transformative acts, specific computing machinery, and computer readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method of operating a processor comprising a plurality of functional units arranged in one or more cores, comprising:
   configuring the functional units to operate in one of two discrete operational modes, a first discrete operational mode being implemented with the functional units in a standard core configuration using a first datapath, and a second discrete mode being implemented with the functional units in a spatial array configuration using a second datapath, wherein each of the functional units is directly coupled to both the first datapath and the second datapath;
   receiving a block of operating instructions, the operating instructions including an indication of the operational mode to be utilized for the block; and
   dynamically reconfiguring the functional units at runtime to operate in one or the other discrete operational mode according to the received block of operating instructions
   wherein the functional units in the spatial array configuration are equal in number to the functional units in the standard core configuration.

2. The method of claim 1 in which the block of operating instructions further includes a static execution schedule for the spatial array configuration.

3. The method of claim 2 in which the static execution schedule is embedded in the received block.

4. The method of claim 3 in which the embedding includes replacing target bits in the operating instructions with static execution schedule information.

5. The method of claim 4 in which the static execution schedule information comprises routing paths or routing tables.

6. The method of claim 2 in which the static execution schedule is included in a separate received block.

7. The method of claim 2 in which the static execution schedule is partially implemented using embedded information in the received block and partially implemented using information in a separate received block.

8. The method of claim 1 further including implementing one or more data queues to store data for processing by the functional units, the data queue being accessible by the functional units when operating in either operational mode.

9. The method of claim 8 in which the data queue is a FIFO (first in, first out) queue.

10. The method of claim 1 in which the functional units are distributed across two distinct processing cores.

11. The method of claim 1 in which the functional units are distributed across four distinct processing cores.

12. The method of claim 1 in which the functional units are distributed across one or more processing cores and in which the second datapath further includes one or more repeaters respectively disposed between one or more of the cores.

13. The method of claim 1 further including coupling the functional units for inter-unit communication using two separate datapaths or two separate control paths.

14. A microarchitecture, comprising:
a plurality of arithmetic logic units (ALUs) distributed across one or more cores of a programmable processor;
a pipelined datapath providing inter-ALU connectivity while the processor is configured to perform standard processing;
a switched network providing inter-ALU connectivity configured to provide switchable configurations of ALUs, the ALUs switchably configurable for standard operations and for spatial array processing, wherein each of the ALUs is directly coupled to both the pipelined datapath and the switched network; and
an instruction set interface configured for receiving instructions, the instructions including operating instructions and control information for dynamically reconfiguring the ALUs during runtime
wherein the ALUs configured for spatial array processing are equal in number to the ALUs configured for standard operations.

15. The microarchitecture of claim 14 in which the switched network comprises a mesh.

16. The microarchitecture of claim 15 in which the mesh is one of 2D mesh or 3D mesh.

17. A method for operating one or more processor cores, comprising:
implementing a plurality of arithmetic logic units (ALUs) instantiated in the one or more processor cores;
implementing one or more fixed spatial arrays external to the one or more processor cores;
simultaneously interconnecting the ALUs using two sets of datapaths, a first set of datapaths being implemented at least in part using a bypass network, a second set of datapaths being implemented at least in part by a switched network, wherein each of the ALUs is directly coupled to both the bypass network and the switched network; and
configuring the ALUs to operate (a) as a spatial array with inter-ALU communications being conducted over the switched network or (b) for general processing with inter-ALU communications being conducted over the bypass network
wherein the ALUs operated in the spatial array are equal in number to the ALUs operated for general processing.

18. The method of claim 17 further including dispatching special instruction blocks to the one or more external spatial arrays for processing.

19. The method of claim 17 further including receiving a block of operating instructions.

20. The method of claim 19 further including dynamically reconfiguring some of the ALUs at runtime according to the received block of operating instruction.

* * * * *